United States Patent
Shelton et al.

(10) Patent No.: US 8,968,153 B1
(45) Date of Patent: Mar. 3, 2015

(54) METHOD OF OPERATING A TRANSMISSION

(71) Applicant: Ford Global Technologies, LLC, Dearborn, MI (US)

(72) Inventors: Matthew John Shelton, Grosse Ile, MI (US); Hong Jiang, Birmingham, MI (US); Felix Nedorezov, Rochester Hills, MI (US); Roger Lyle Huffmaster, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/962,148

(22) Filed: Aug. 8, 2013

(51) Int. Cl.
*B60W 10/00* (2006.01)
*B60W 10/02* (2006.01)
*B60W 10/10* (2012.01)
*B60W 10/06* (2006.01)

(52) U.S. Cl.
CPC ............... *B60W 10/02* (2013.01); *B60W 10/10* (2013.01); *B60W 10/06* (2013.01); *B60W 2510/06* (2013.01); *B60W 2510/0241* (2013.01); *Y10S 477/904* (2013.01)
USPC ............................... 477/84; 477/904; 701/54

(58) Field of Classification Search
USPC ......... 477/70, 83, 84, 86, 92, 93, 77, 80, 107, 477/166, 167, 170, 181, 174, 175, 904
See application file for complete search history.

(56) References Cited

U.S. PATENT DOCUMENTS

| | | | |
|---|---|---|---|
| 8,070,648 B2 | 12/2011 | Soliman et al. | |
| 8,147,373 B2 | 4/2012 | Soliman et al. | |
| 2002/0055415 A1* | 5/2002 | Yoshikawa et al. | 477/166 |
| 2011/0070999 A1 | 3/2011 | Soliman et al. | |
| 2011/0118078 A1* | 5/2011 | Kraska et al. | 477/5 |

* cited by examiner

*Primary Examiner* — Justin Holmes
(74) *Attorney, Agent, or Firm* — James Dottavio; Brooks Kushman P.C.

(57) ABSTRACT

A method of controlling a launch clutch during an engine restart event commands a positive torque capacity before the engine reaches idle speed. Early application of the launch clutch reduces the time delay between brake pedal release and vehicle acceleration. To avoid excessive drag on the engine during the restart event, the torque capacity is adjusted using closed loop control. A controller calculates a maximum rate of change of torque capacity based on measured engine speed and an engine acceleration and does not increase the commanded torque capacity faster than the calculated rate. In some circumstances the maximum rate of change may be negative, resulting in a reduction in commanded torque capacity.

16 Claims, 7 Drawing Sheets

METHOD OF OPERATING A TRANSMISSION

TECHNICAL FIELD

This disclosure relates to the field of automatic transmissions for motor vehicles. More particularly, this disclosure relates to the control of controlling a launch clutch during an engine restart.

BACKGROUND

Internal combustion engines are operable over a limited range of engine speeds. Engines typically must be rotating at least a few hundred revolutions per minute (rpm) to produce power. Since an engine cannot produce power at very low speeds, the engine has traditionally been operated at a predetermined idle speed even while the vehicle is stationary and no power is required. To reduce fuel consumption, it is desirable not to operate the internal combustion engine while the vehicle is stationary such as while waiting at a traffic light. If the engine is stopped when the vehicle is stationary, then the engine must be restarted when the driver indicates a desire to move, generally by releasing the brake pedal and pressing the accelerator pedal. The time required to restart the engine may result in an undesirable delay. For transmissions with a launch clutch, proper control of the torque capacity of the launch clutch is important to minimize the delay.

SUMMARY OF THE DISCLOSURE

A method of operating a vehicle includes engaging elements of a transmission to configuring the transmission in preparation for vehicle launch prior to starting an engine and then increasing the torque capacity of a launch clutch during an engine start event. When the transmission is so configured, it applies a first torque resisting the rotation of the engine and a second torque tending to accelerate the vehicle wheels. When the launch clutch is slipping, the first and second torques are both proportional to the torque capacity of the launch clutch. The method may further include adjusting the torque capacity of the launch clutch using the engine speed and engine acceleration as feedback signals. The feedback control may include calculating a maximum rate of change of torque capacity based on the engine speed and engine acceleration and limiting the rate of change of commanded torque capacity to the calculated maximum rate of change. In some circumstances, this maximum rate of change may be negative in which case the commanded torque capacity will decrease. The launch clutch may be an input clutch of the transmission, in which case the first torque resisting rotation of the engine will be equal to the torque capacity of the launch clutch while the launch clutch is slipping. One such type of transmission is a dual clutch transmission. The launch clutch may be an electro-mechanically actuated clutch.

In another embodiment, a method of operating a transmission includes, as an input shaft transitions from stationary to a predefined idle speed, measuring an input shaft speed, commanding a launch clutch to transmit torque, and adjusting the torque capacity of the launch clutch based on the input shaft speed. Commanding the launch clutch to transmit torque prior to the engine reaching idle speed results in earlier vehicle acceleration. Adjusting the launch clutch torque based on the measured input shaft speed prevents the method from excessively increasing the time required for the engine start event. The adjustment of commanded torque capacity may additionally be based on input shaft acceleration. In some circumstances, the torque capacity of the launch clutch may be reduced during the engine start event. The transmission may be, for example, a dual clutch transmission. The launch clutch may be, for example, electro-mechanically actuated.

In another embodiment, a vehicle includes an engine, a transmission, a wheel, and a controller. The controller is programmed to configure the transmission to transmit torque from the engine to the wheel such that the torque applied to the wheel is proportional to the torque capacity of a launch clutch and then to adjust the torque capacity of the launch clutch based on feedback signals including engine speed and engine acceleration. The controller may adjust the torque capacity while the engine speed is less than a predetermined engine idle speed. The adjustment may include limiting the rate of change of torque capacity to a value determined based on engine speed and engine acceleration. The transmission may be a dual clutch type transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
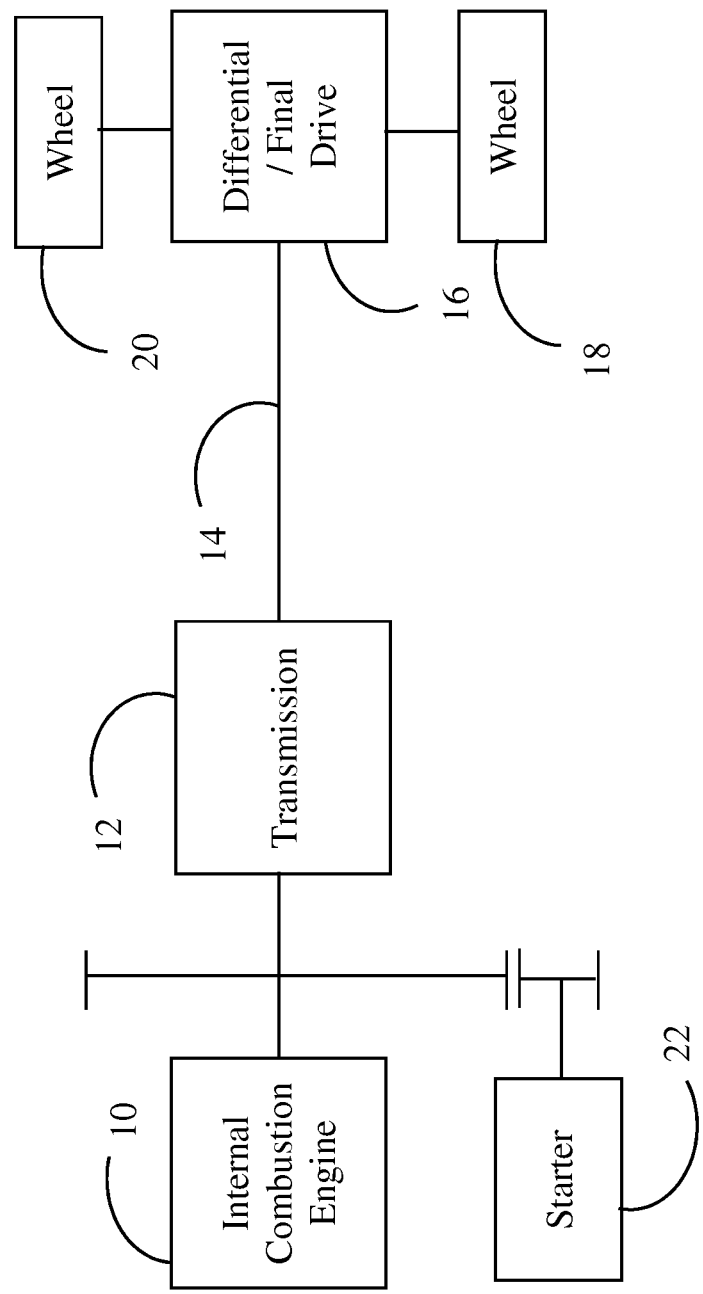
FIG. 1 is a schematic illustrating a powertrain configuration of a vehicle.

FIG. 1 illustrates a typical rear wheel drive powertrain configuration for a vehicle. Internal combustion engine 10 provides the primary motive power. Transmission 12 absorbs power from engine 10 and delivers the power to driveshaft 14 which rotates at a speed proportional to vehicle speed. When driveshaft 14 is stationary, the transmission allows the engine to rotate at a suitable engine speed. Driveshaft 14 is connected to a differential/final drive 16 which further multiplies the torque and divides the torque between left and right half shafts while allowing the left and right half shafts to rotate at slightly different speeds relative to one another. One halfshaft drives a left wheel 18 while the other drives a right wheel 20. Starter 22 is an electric motor that accelerates the engine to a sufficient speed for the engine to generate power. A front wheel drive powertrain is conceptually similar, except that the wheels and halfshafts rotate about an axis parallel to and offset from the engine and transmission axis. The driveshaft is replaced by axis transfer gearing.

Many transmissions include some type of launch device to transmit power from a rotating input shaft to a stationary output shaft. In some transmissions, the launch device is a launch clutch. A friction clutch may transmits torque from one rotating element to another element that is stationary or is rotating more slowly. When the launch clutch is slipping, the amount of torque that is transferred is determined by the clutches torque capacity. The clutch torque, input torque, and output torque are proportional to one another. If the launch clutch is an input clutch, then the clutch torque is equal to the input torque.

A controller typically adjusts the torque capacity of the clutch by controlling the amount of normal force between the frictional surfaces. In some transmissions, the normal force is applied by a hydraulic piston. When hydraulic actuation is used, a source of pressurized fluid is required. Typically, the fluid is pressurized by an engine driven pump, but if engagement of the clutch while the engine is stopped is desired, then some other source of hydraulic pressure is required. Alternatively, the clutch may be actuated by an electro-mechanical mechanism. An electro-mechanical actuation system operates while the engine is stopped by utilizing energy stored in an electric battery.

A dual clutch transmission is a type of transmission that has two friction clutches, one for odd numbered gear ratios and one for even numbered gear ratios. The various ratios are engaged by engaging one of more synchronizers or dog clutches to select the gear ratio and then engaging the corresponding clutch. Traditionally, a vehicle is prepared for launch by engaging the synchronizers or dog clutches for first gear while the engine is idling and both clutches are disengaged. Then, in response to the driver pressing the accelerator pedal, the clutch corresponding to first gear is gradually engaged. The clutch is allowed to slip until the vehicle accelerates to a speed allowing the clutch to be fully engaged without excessively restricting the engine speed. To prepare for a shift to second gear, the synchronizers or dog clutches corresponding to second gear are engaged while the even gear clutch is disengaged. Then, the even gear clutch is gradually engaged while the odd gear clutch is disengaged resulting in a transfer of the power flow.

Many vehicles are designed to creep, or move slowly forward, when the driver releases the brake pedal without pressing the accelerator pedal. The time required to restart the engine may result in an undesirable delay initiating the creep after the driver releases the brake pedal. In a transmission with a torque converter, creep is inherent whenever the engine is running due to the characteristics of the torque converter. In a transmission that utilizes a launch clutch, such as a dual clutch transmission, creep is accomplished by setting the torque capacity of the launch clutch to a suitable level. To minimize the delay, it is important to set the torque capacity of the launch clutch to the suitable level as soon as possible. However, since the launch clutch resist rotation of the engine, premature application can delay, or in some cases prevent, the engine from accelerating to the idle speed.

Figure 2:
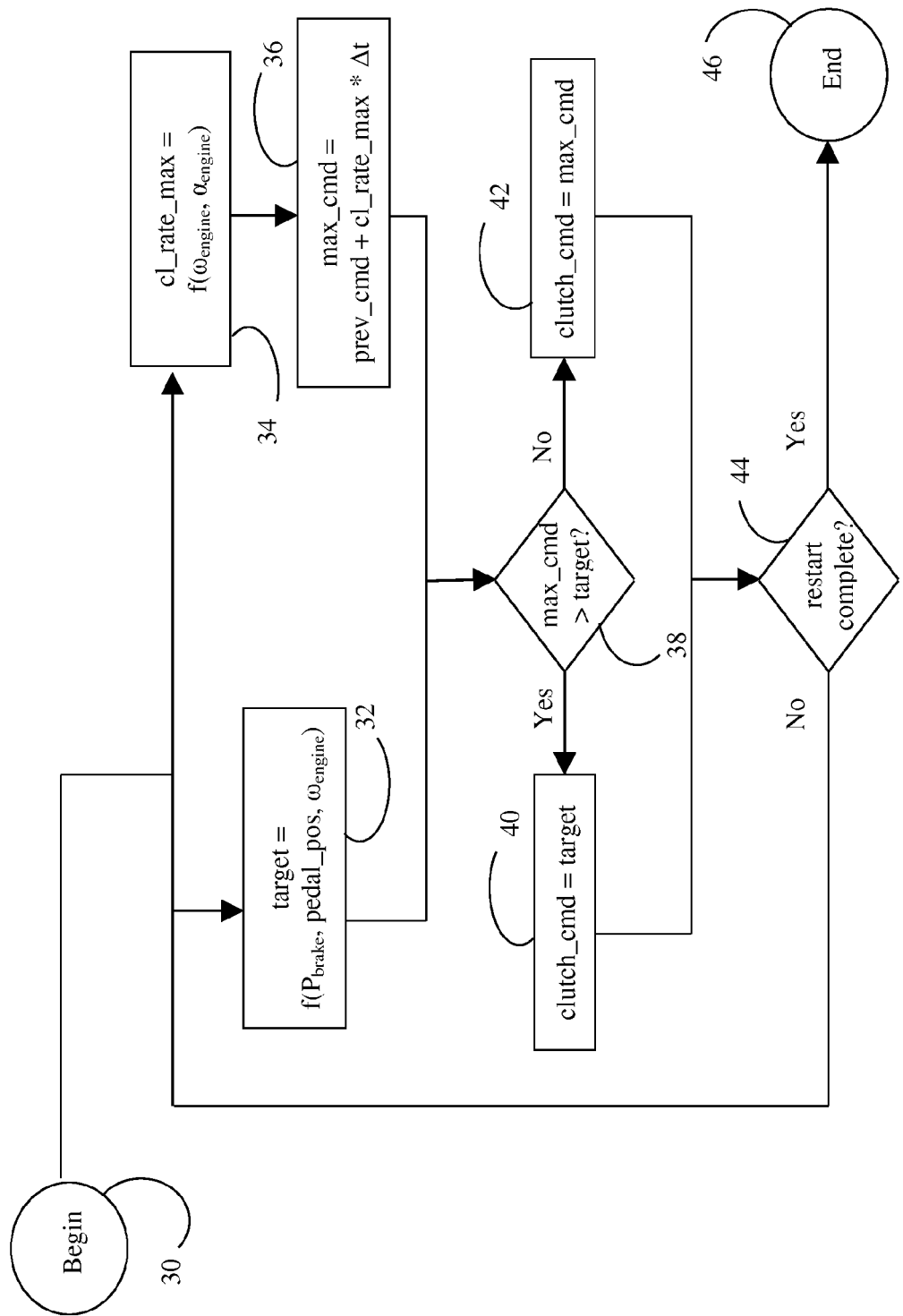
FIG. 2 is a flow chart illustrating a method of setting the torque capacity during an engine restart event.

FIG. 2 illustrates an algorithm for controlling the torque capacity of a launch clutch during an engine restart event. The method begins at 30 when the starter is commanded to accelerate the engine. At 32, a target clutch torque is calculated based on the measured brake pressure, $P_{brake}$, the accelerator pedal position, pedal_pos, and the measured engine speed, $\omega_{engine}$. When the brake pressure is below a threshold indicating that the brakes are released and the engine speed is equal to the idle speed, the target is equal to the creep torque capacity. If the brake pressure indicates that the driver is still depressing the brake pedal, the target is less than the creep torque capacity. When the accelerator pedal has been depressed and the brake pedal released, then the target may be greater than the creep torque. When the engine speed is between zero and the idle speed, the clutch torque capacity target may be between zero and the creep torque capacity such that the vehicle will begin to move but the engine will not be excessively restrained. At 34, a maximum rate of change of the commanded torque capacity, cl_rate_max, is calculated based on the measured engine speed and the engine acceleration, $\alpha_{engine}$. The engine acceleration may be either measured directly or computed as the rate of change of the engine speed. At 36, the maximum torque capacity command, max_cmd, is calculated from the previous torque capacity command, prev_cmd, the maximum rate of change, and the time step between updates, $\Delta t$. At 38, the maximum torque capacity command is compared to the target. If the target is lower, the commanded torque capacity, clutch_cmd, is set to the target at 40. If the target is higher, the commanded torque capacity is set to the maximum at 42. This process is repeated until the end of the restart event is detected at 44.

Figure 3:
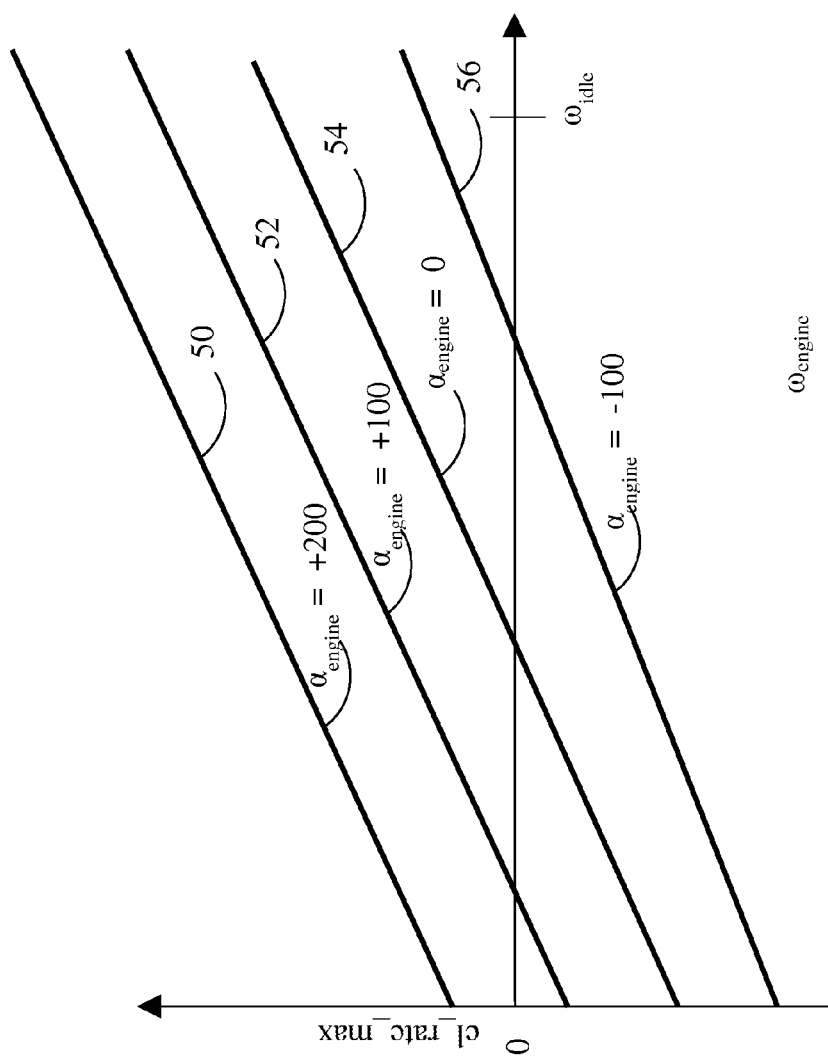
FIG. 3 illustrates a function suitable for use in the method of FIG. 2.

FIG. 3 illustrates the relationship between the engine speed, engine acceleration, and maximum rate of change of the torque capacity. Line 50 and 52 correspond to a situation where the engine is accelerating toward the idle speed. The maximum rate of change is set to a high value such that the target will determine the commanded torque capacity. Line 54 corresponds to a situation where the engine acceleration is zero implying that the engine speed is constant. If the engine speed is near the engine idle speed, constant engine speed is normal and a high maximum rate ensures that the commanded torque capacity will be determined by the target. However, a zero acceleration at an engine speed significantly below the idle speed indicates that the start event is not progressing normally and the rate of increase of clutch torque should be limited in order to avoid impeding the engine. If this occurs at a sufficiently low speed, the rate of change will be negative which will result in the commanded torque capacity being reduced. Line 56 corresponds to a situation where the engine is slowing down. Near the idle speed, this could reflect a normal oscillation around the idle speed. In such a circumstance, the maximum rate of change is positive and the commanded torque capacity will still follow the target. Below the idle speed, a negative acceleration will result in a negative maximum rate which will result in decreasing the commanded clutch torque.

Figure 4A:
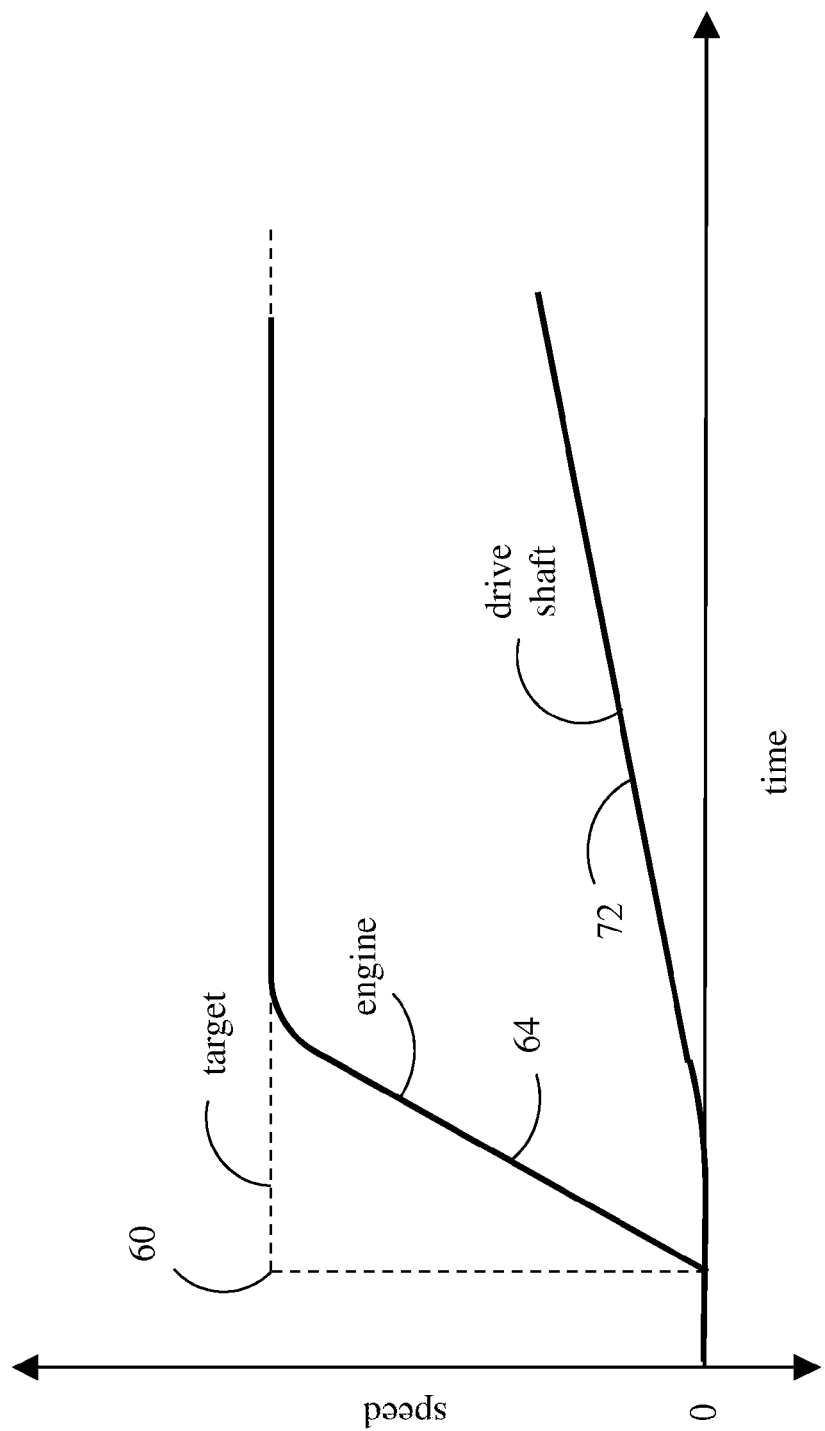
FIGS. 4A and 4B illustrate speed and torque, respectively, during a normal engine restart event.
Figure 4B:
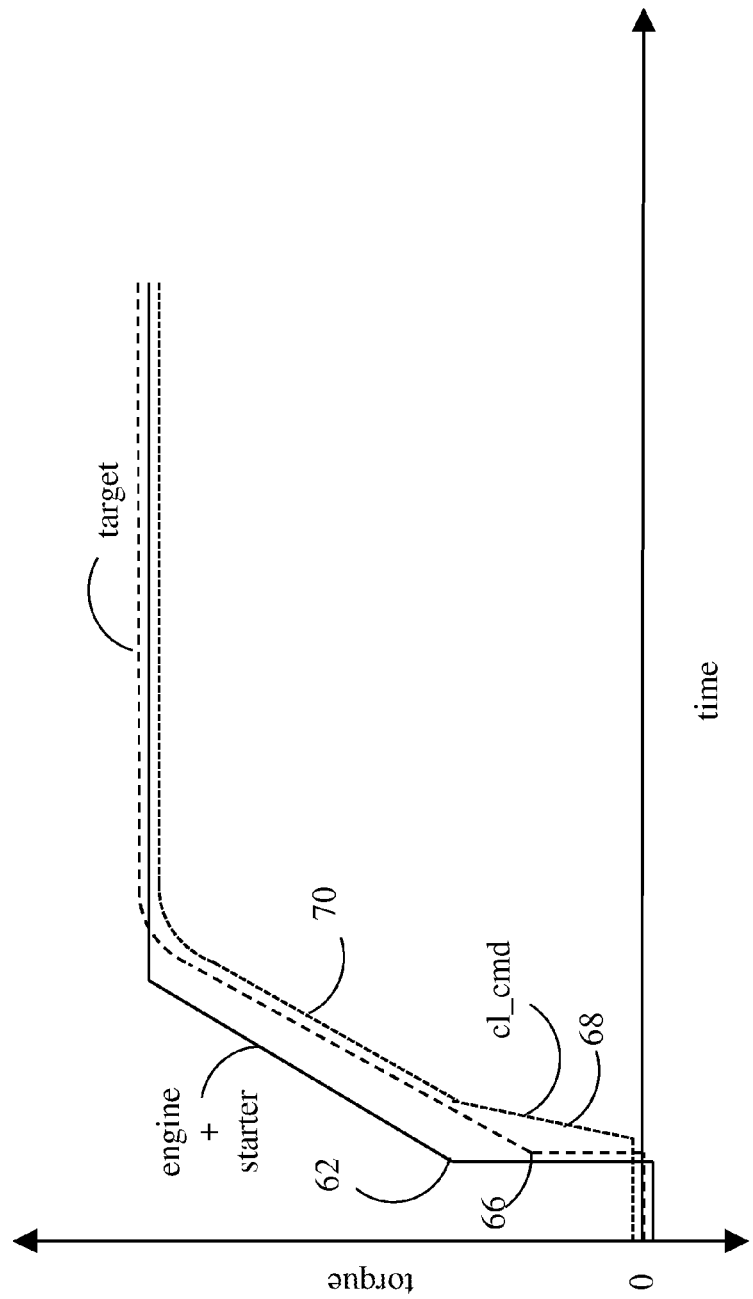

FIGS. 4A and 4B illustrate how the method operates during a normal engine restart event. When the restart event is initiated, the target engine speed immediately increases to the idle speed as illustrated by line 60. As indicated by line 62, the torque applied by the engine and the starter immediately increases. Initially, this torque is exclusively provided by the starter because the engine is incapable of generating torque at zero speed. In response to this torque, the engine speed begins to increase as shown by line 64. As the engine speed increases, the target torque capacity increases as shown at 66. The commanded torque capacity may initially lag slightly behind the target as shown at 68 due to the maximum rate of change imposed by the method. However, throughout most of the event, the commanded torque capacity tracks the target torque capacity as shown at 70. The drive shaft speed gradually increases in response to the clutch torque as shown at 72.

Figure 5A:
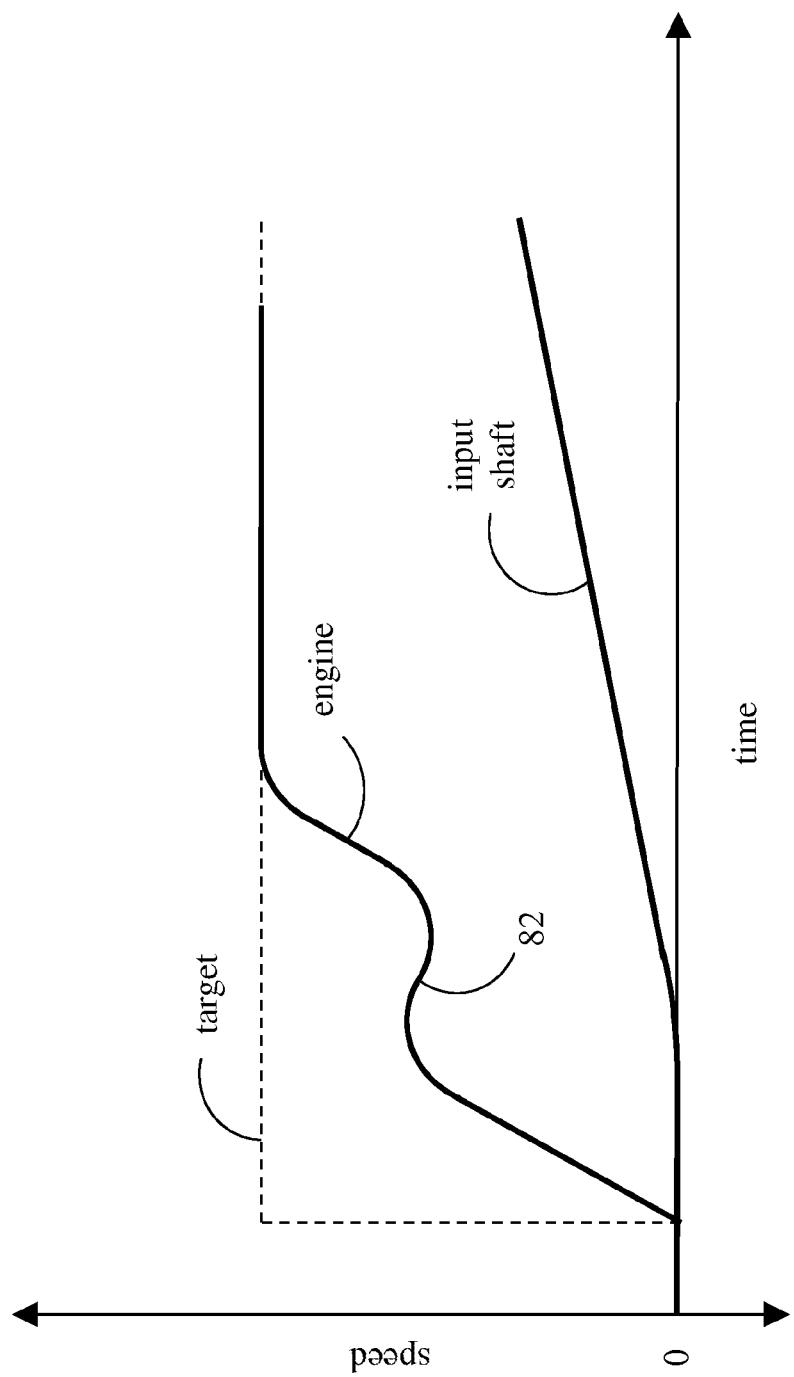
FIGS. 5A and 5B illustrate speed and torque, respectively, during a faltering engine start event.
Figure 5B:
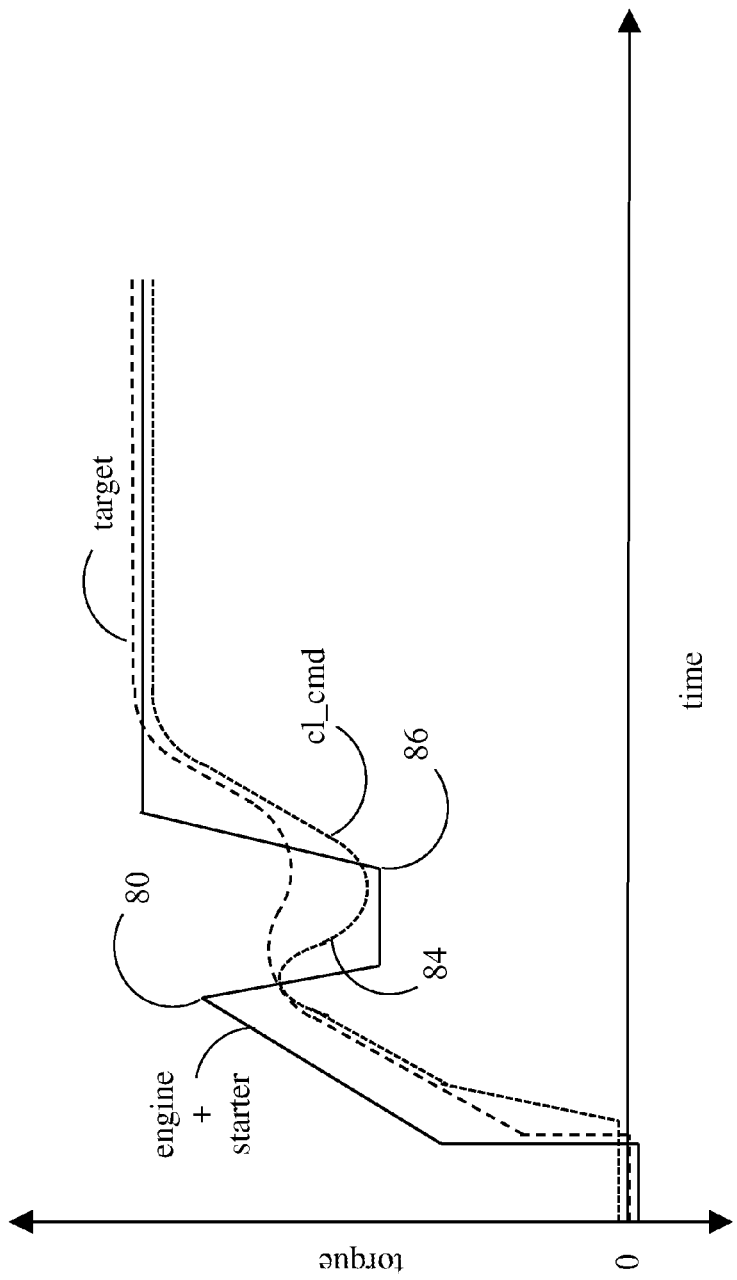

FIGS. 5A and 5B illustrate how the method operates when the engine falters during a restart event. The event proceeds as in FIGS. 4A and 4B until the engine torque suddenly decreases at 80. When the engine torque is less than the clutch torque, the engine speed drops as shown at 82. In response to this negative engine acceleration, the maximum rate of change of commanded torque capacity becomes negative causing the commanded torque capacity to decrease below the target at 84. The decrease in clutch torque capacity reduces the load on the engine preventing a further decline in engine speed. Once the problem is resolved at 86, the engine torque returns to the desired level and the engine resumes accelerating.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a vehicle comprising:
   engaging elements of a transmission such that the transmission applies an input torque to resist rotation of an engine and applies an output torque to a wheel, wherein the input torque and the output torque each vary in proportion to a torque capacity of a launch clutch of the transmission; and
   during a start event of the engine and while an engine speed is less than an idle speed, increasing the torque capacity of the clutch to initiate application of the input torque and the output torque to initiate acceleration of the vehicle and adjusting the torque capacity of the launch clutch based on an engine speed and an engine acceleration.

2. The method of claim 1 wherein a rate of change of torque capacity is based on the engine speed and the engine acceleration.

3. The method of claim 2 wherein the rate of change of torque capacity is negative.

4. The method of claim 1 wherein the input torque is equal to the torque capacity of the launch clutch.

5. The method of claim 4 wherein the transmission is a dual clutch transmission.

6. The method of claim 1 wherein the launch clutch is an electro-mechanically actuated clutch.

7. A method of operating a transmission comprising:
   as an input shaft transitions from stationary to a predefined idle speed,
   measuring an input shaft speed;
   commanding a launch clutch to transmit torque such that the transmission resists rotation of the input shaft and exerts torque on an output shaft to accelerate the output shaft; and
   adjusting a torque capacity of the launch clutch based on the input shaft speed to permit an engine start.

8. The method of claim 7 further comprising adjusting the torque capacity of the launch clutch based on an input shaft acceleration.

9. The method of claim 8 wherein a rate of change of torque capacity is based on the input shaft speed and the input shaft acceleration.

10. The method of claim 9 wherein the rate of change of torque capacity is negative.

11. The method of claim 7 wherein the transmission is a dual clutch transmission.

12. The method of claim 7 wherein the clutch is an electro-mechanically actuated clutch.

13. A vehicle comprising:
    an engine;
    a wheel;
    a transmission; and
    a controller programmed to
      configure the transmission to transmit torque from the engine to the wheel such that the torque applied to the wheel is proportional to a torque capacity of a launch clutch; and
      adjust the torque capacity of the launch clutch based on an engine speed and an engine acceleration to increase responsiveness of the vehicle.

14. The vehicle of claim 13 wherein
    the controller is further programmed to control the engine to maintain a predetermined idle engine speed and
    the torque capacity of the launch clutch is adjusted while the engine speed is less than the predetermined idle engine speed.

15. The vehicle of claim 13 wherein a rate of change of torque capacity of the clutch is based on engine speed and engine acceleration.

16. The vehicle of claim 13 wherein the transmission is a dual clutch transmission.

* * * * *